United States Patent
Enoki

(10) Patent No.: US 9,692,351 B2
(45) Date of Patent: Jun. 27, 2017

(54) PROTECTIVE DEVICE FOR VEHICLE INVERTER

(71) Applicant: Mitsubishi Electric Corporation, Tokyo (JP)

(72) Inventor: Keiichi Enoki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/022,380

(22) PCT Filed: Nov. 7, 2013

(86) PCT No.: PCT/JP2013/080135
§ 371 (c)(1),
(2) Date: Mar. 16, 2016

(87) PCT Pub. No.: WO2015/068240
PCT Pub. Date: May 14, 2015

(65) Prior Publication Data
US 2016/0226431 A1    Aug. 4, 2016

(51) Int. Cl.
*H02P 1/00* (2006.01)
*H02P 29/68* (2016.01)
(Continued)

(52) U.S. Cl.
CPC ............. *H02P 29/68* (2016.02); *H02H 6/00* (2013.01); *H02H 7/122* (2013.01); *H02P 27/06* (2013.01); *H02P 29/032* (2016.02)

(58) Field of Classification Search
CPC ......... H02P 29/68; H02P 29/032; H02P 27/06
(Continued)

(56) References Cited

U.S. PATENT DOCUMENTS

2003/0169001 A1* 9/2003 Murakami ............... B60K 6/28
   318/139
2005/0144576 A1* 6/2005 Furuta ................. G06F 17/5045
   327/513
(Continued)

FOREIGN PATENT DOCUMENTS

JP   09-233832 A   9/1997
JP   11-278088 A   10/1999
(Continued)

OTHER PUBLICATIONS

International Search Report of PCT/JP2013/080135 dated Jan. 14, 2014 [PCT/ISA/210].

*Primary Examiner* — Eduardo Colon Santana
*Assistant Examiner* — Gabriel Agared
(74) *Attorney, Agent, or Firm* — Sughrue Mion, PLLC; Richard C. Turner

(57) ABSTRACT

This invention provides a protective device for a vehicle inverter, with which an inverter element can be protected from overheating while preventing a reduction in drivability. The protective device for a vehicle inverter includes a maximum element temperature calculation unit that calculates a maximum element temperature among respective element temperatures of the inverter, and an element temperature output limit coefficient calculation unit that calculates an output limit value corresponding to the maximum element temperature, sets a current output limit value as a current output limit coefficient when the current output limit value is smaller than a preceding output limit coefficient, and sets, as the current output limit coefficient, a value obtained by adding a predetermined value determined in advance to the preceding output limit coefficient when the current output limit value equals or exceeds the preceding output limit coefficient.

3 Claims, 9 Drawing Sheets

(51) Int. Cl.
*H02P 27/06* (2006.01)
*H02H 7/122* (2006.01)
*H02H 6/00* (2006.01)
*H02P 29/032* (2016.01)

(58) Field of Classification Search
USPC .......................................................... 318/139
See application file for complete search history.

(56) References Cited

U.S. PATENT DOCUMENTS

| | | | | |
|---|---|---|---|---|
| 2008/0297268 | A1* | 12/2008 | Matsui ................... | H03L 1/025 |
| | | | | 331/176 |
| 2011/0273141 | A1* | 11/2011 | Kanbayashi ............. | B60K 6/48 |
| | | | | 320/134 |
| 2012/0212169 | A1* | 8/2012 | Wu .......................... | H02P 7/285 |
| | | | | 318/432 |
| 2012/0262130 | A1* | 10/2012 | Nakajima ............... | H02P 9/107 |
| | | | | 322/34 |
| 2013/0135906 | A1* | 5/2013 | Kawamura ............. | H01L 23/36 |
| | | | | 363/40 |
| 2013/0311026 | A1* | 11/2013 | Endo ..................... | B60L 3/0046 |
| | | | | 701/22 |
| 2013/0317664 | A1* | 11/2013 | James ..................... | H02P 23/14 |
| | | | | 700/299 |

FOREIGN PATENT DOCUMENTS

| | | |
|---|---|---|
| JP | 2001-169401 A | 6/2001 |
| JP | 2007-331646 A | 12/2007 |
| JP | 4710399 B2 | 6/2011 |
| JP | 2013-048499 A | 3/2013 |

* cited by examiner

PROTECTIVE DEVICE FOR VEHICLE INVERTER

CROSS REFERENCE TO RELATED APPLICATIONS

This application is a National Stage of International Application No. PCT/JP2013/080135, filed Nov. 7, 2013, the contents of which are incorporated herein by reference in its entirety.

TECHNICAL FIELD

This invention relates to a protective device for a vehicle inverter.

BACKGROUND ART

A control device for an electric vehicle, which includes temperature detecting means for detecting temperatures of individual power devices and outputting respective temperature values thereof and a gate control circuit having a protective function for limiting a current of an inverter on the basis of the highest device temperature among the temperature values output by the temperature detecting means, has been proposed as a conventional device for protecting an inverter element from overheating (see PTL 1, for example).

Further, in a proposed overheating protection method, switching characteristics of a switching element provided in an inverter, such as normally ON loss, switching loss, and transient thermal impedance, are stored together with a switching element loss calculation formula in a storage device serving as a memory of a control unit, whereupon a CPU of the control unit derives a loss of the switching element from the calculation formula, the normally ON loss, switching loss, and so on stored in the memory having been inserted into the calculation formula using as variables an output current approximating a rectangular wave, a control factor, and an output frequency that are detected in the inverter. The CPU then calculates an element junction temperature using the derived loss and the transient thermal impedance of the memory, and implements output current control on the inverter such that the element junction temperature does not exceed a set temperature (see PTL 2, for example).

CITATION LIST

Patent Literature

[PTL 1]
Japanese Patent Application Publication No. 2001-169401
[PTL 2]
Japanese Patent Application Publication No. H9-233832

SUMMARY OF INVENTION

Technical Problem

However, the following problem occurs in the prior art.
When a motor rotates at an extremely low speed while generating a large amount of torque, a large amount of current flows through a specific element for a long period of time, and since the element is switched ON and OFF in synchronization with the rotation of the motor, the element temperature becomes oscillatory so as to vary by a large amount. Therefore, when a torque limit is applied in accordance with the element temperature, torque variation may increase, leading to a reduction in drivability.

Here, the inventions described in PTL 1 and PTL 2 both apply a torque limit in accordance with the element temperature, and therefore a reduction in drivability occurs when the motor rotates at an extremely low speed while generating a large amount of torque.

This invention has been designed to solve the problem described above, and an object thereof is to obtain a protective device for a vehicle inverter with which an inverter element can be protected from overheating while preventing a reduction in drivability.

Solution to Problem

A protective device for a vehicle inverter according to this invention protects an inverter that drives a motor provided in a vehicle as a power source from overheating, and includes a maximum element temperature calculation unit that calculates a maximum element temperature among respective element temperatures of the inverter, an element temperature output limit coefficient calculation unit that calculates an output limit value corresponding to the maximum element temperature, sets a current output limit value as a current output limit coefficient when the current output limit value is smaller than a preceding output limit coefficient, and sets, as the current output limit coefficient, a value obtained by adding a predetermined value determined in advance to the preceding output limit coefficient when the current output limit value equals or exceeds the preceding output limit coefficient, a basic torque limit value calculation unit that calculates a basic torque limit value from a map on the basis of a motor rotation speed of the motor, and a torque limit value determination unit that determines a torque limit value by multiplying the basic torque limit value by the element temperature output limit coefficient.

Advantageous Effects of Invention

With the protective device for a vehicle inverter according to this invention, the inverter element can be protected from overheating by applying a torque limit rapidly in accordance with the maximum element temperature when the maximum element temperature increases, and a reduction in drivability can be prevented even when the maximum element temperature varies in an oscillatory fashion so as to decrease temporarily by removing the torque limit gradually so that variation in the torque limit is suppressed.

DESCRIPTION OF EMBODIMENTS

A preferred embodiment of a protective device for a vehicle inverter according to this invention will be described below using the drawings. Identical or corresponding parts of the drawings will be described using identical reference symbols.

First Embodiment

Figure 1:
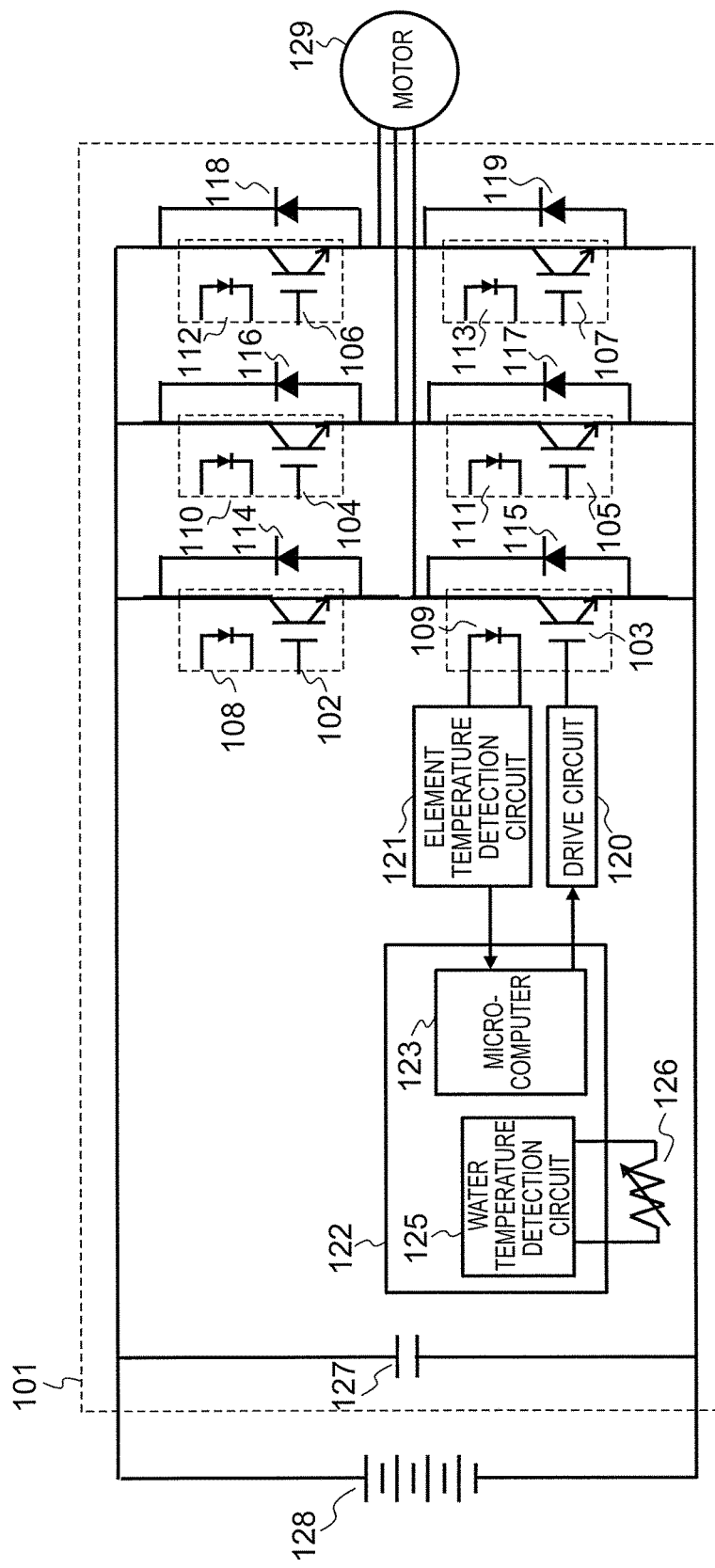
FIG. 1 is a view showing an overall configuration of a system including a protective device for a vehicle inverter according to a first embodiment of this invention.

FIG. 1 is a view showing an overall configuration of a system including a protective device for a vehicle inverter according to a first embodiment of this invention. In FIG. 1, an inverter 101 is configured to drive a three-phase alternating current motor 129 by ON/OFF-controlling IGBTs (insulated gate bipolar transistors) 102 to 107 serving as switching elements in order to convert direct current power from a battery 128 into three-phase alternating current power.

Diodes 108 to 113 are mounted on chips of the IGBTs 102 to 107 as element temperature sensors, and temperatures of the chips are detected by an element temperature detection circuit 121 using the fact that forward voltages of the diodes exhibit a negative temperature characteristic. Further, regenerative diodes 114 to 119 used to regenerate power are connected to the IGBTs 102 to 107.

Note that to prevent the drawing from becoming overly complicated, only the diode 109 is shown to be connected to the element temperature detection circuit 121, and the connections of the other diodes are omitted. However, all of the diodes are connected to the element temperature detection circuit 121.

Furthermore, the IGBTs 102 to 107 are driven by a control device 122 via drive circuits 120. The control device 122 is provided with a microcomputer 123 that performs calculations relating to control of the motor and issues instructions to switch the IGBTs 102 to 107 ON and OFF, and a water temperature detection circuit 125 that detects a temperature of cooling water in the inverter 101 using a thermistor 126. Note that in FIG. 1, only the drive circuit relating to the IGBT 103 is shown.

Figure 2:
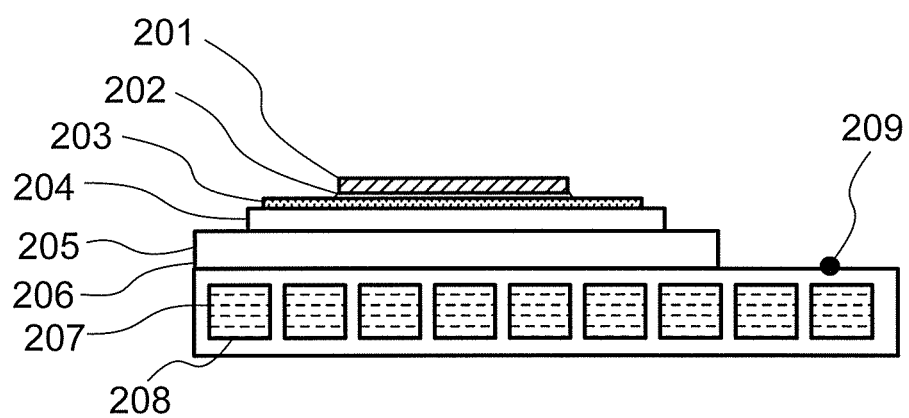
FIG. 2 is a view showing an example configuration of a packaging structure of an IGBT chip shown in FIG. 1.

FIG. 2 is a view showing an example configuration of a packaging structure of the IGBT chip shown in FIG. 1. In FIG. 2 an IGBT chip 201, solder 202, copper foil 203, an insulation substrate 204, a heat sink 205, grease 206, and a water cooling jacket 207 are laminated in descending order.

By passing cooling water 208 through a water passage provided in the water cooling jacket 207 as a coolant, heat generated in the IGBT chip 201 is removed by the cooling water 208. Further, the thermistor 209 serving as a water temperature sensor is embedded in the water cooling jacket 207.

Figure 3:
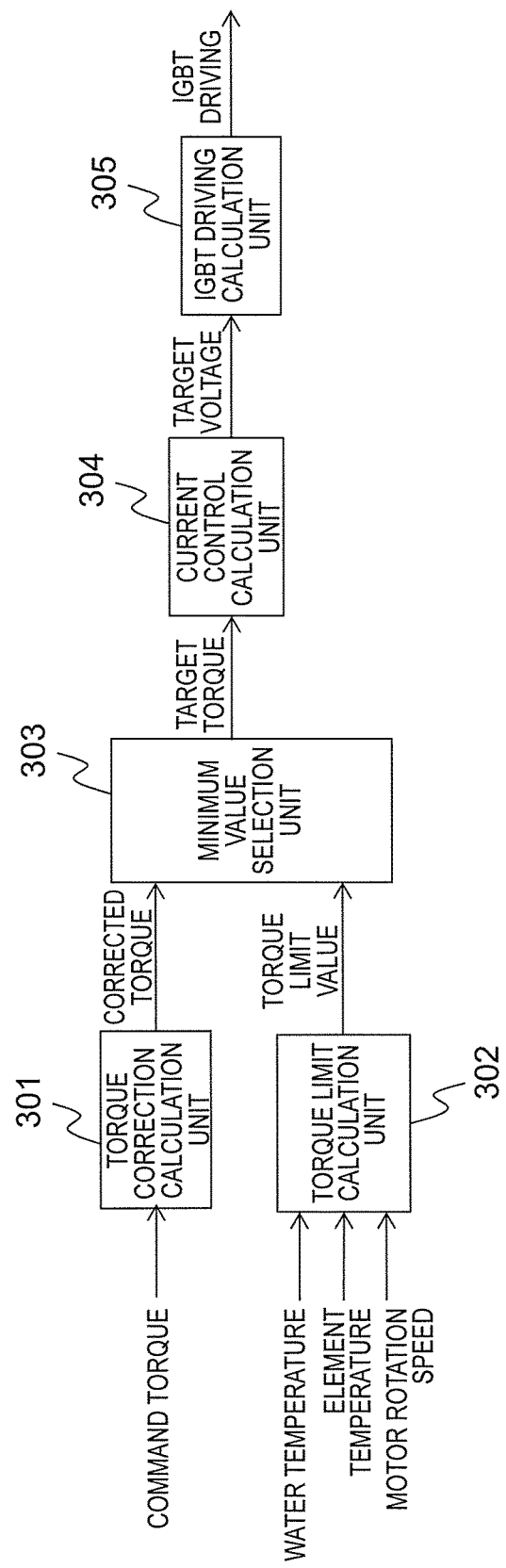
FIG. 3 is a block diagram showing a configuration of a motor control unit of the protective device for a vehicle inverter according to the first embodiment of this invention.

FIG. 3 is a block diagram showing a configuration of a motor control unit of the protective device for a vehicle inverter according to the first embodiment of this invention. The motor control unit is provided in the microcomputer 123 shown in FIG. 1.

Firstly, when a large amount of motor torque is generated and a motor rotation speed is extremely low, an increase in the element temperature does not appear in the water temperature, and it is therefore necessary to detect the element temperature directly in order to suppress the motor torque and thereby protect the inverter element from overheating. Moreover, in recent hybrid vehicles, the same cooling water tends to be used as both inverter cooling water and engine cooling water, and as a result, the temperature of the cooling water may increase even when the inverter is not driven. It is therefore necessary to detect the cooling water temperature in order to suppress the motor torque and thereby protect the inverter element from overheating.

However, when torque limits are applied simultaneously in accordance with the water temperature of the cooling water and the element temperature, an output may be suppressed excessively, leading to a reduction in drivability. Hence, in the first embodiment of this invention, torque limitation is implemented appropriately by performing processing to apply a torque limit on the basis of the smaller of a coefficient calculated in accordance with the water temperature and a coefficient calculated in accordance with the element temperature.

In FIG. 3, the motor control unit includes a torque correction calculation unit 301, a torque limit calculation unit 302, a minimum value selection unit 303, a current control calculation unit 304, and an IGBT driving calculation unit 305.

The torque correction calculation unit 301 receives a torque command from an external vehicle controller (not shown) via a CAN (Controller Area Network), not shown, for example, calculates various torque corrections in accordance with the torque command, and outputs the calculated torque correction as a corrected torque.

The torque limit calculation unit 302 calculates a torque limit value on the basis of the water temperature of the cooling water, detected by the water temperature detection circuit 125, the element temperature detected by the element temperature detection circuit 121, and a motor rotation speed calculated from a signal output by a resolver (not shown) provided in the motor 129, for example.

The minimum value selection unit 303 applies a torque limit by comparing the corrected torque output by the torque correction calculation unit 301 with the torque limit value output by the torque limit calculation unit 302, and selecting the smaller value thereof as a target torque.

The current control calculation unit 304 feedback-controls a motor current and outputs a target voltage so as to realize the target torque output by the minimum value selection unit 303. The IGBT driving calculation unit 305 drives the IGBT so as to realize the target voltage output by the current control calculation unit 304.

Note that when the torque limit calculation unit 302 is not provided, the corrected torque calculated by the torque correction calculation unit 301 is output as is to the current control calculation unit 304 as the target torque, whereupon the target voltage is set on the basis of the target torque.

Figure 4:
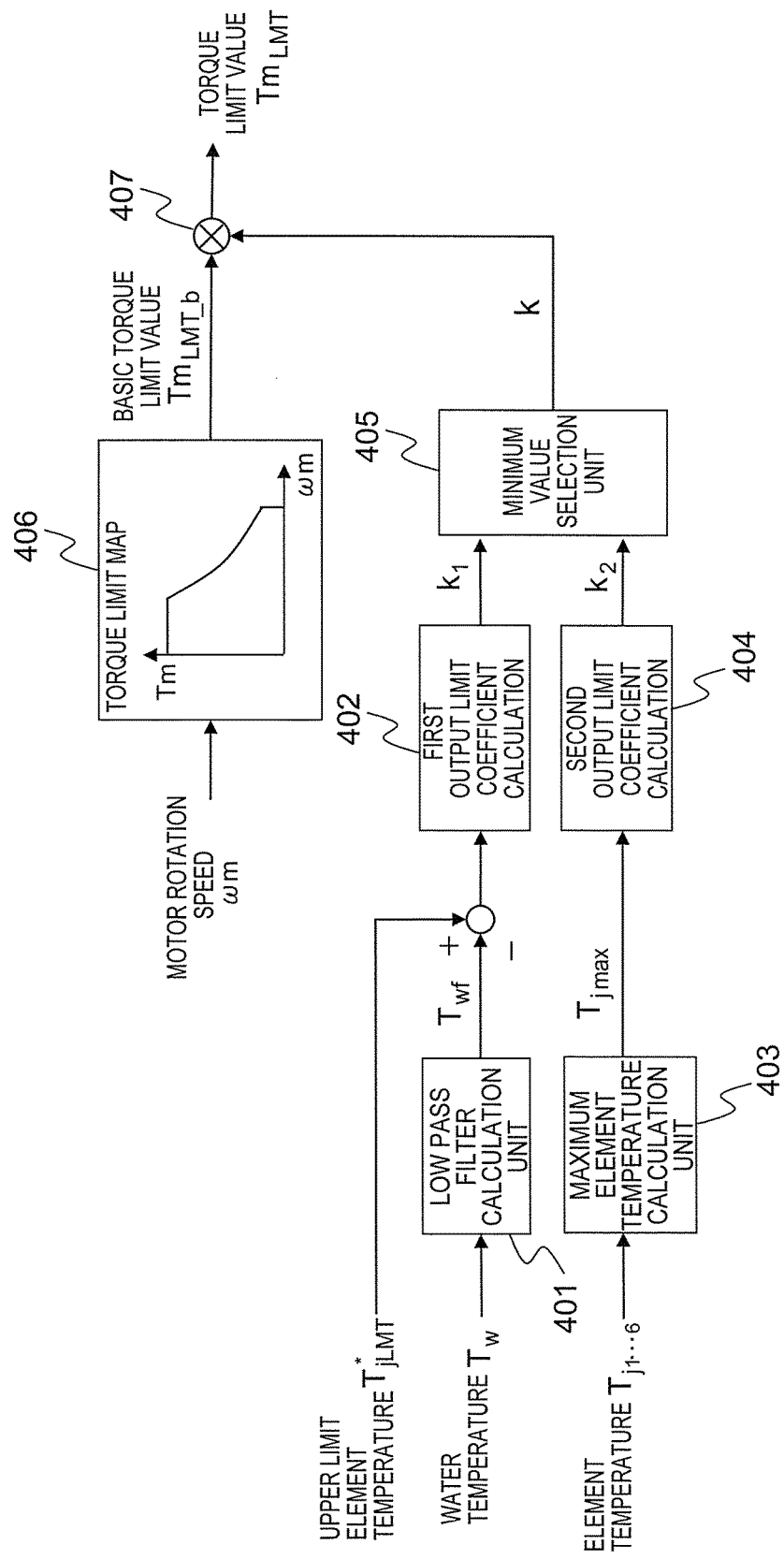
FIG. 4 is a block diagram showing in detail a configuration of a torque limit calculation unit shown in FIG. 3.

FIG. 4 is a block diagram showing in detail a configuration of the torque limit calculation unit 302 shown in FIG.

3. In FIG. 4, the torque limit calculation unit 302 includes a low pass filter calculation unit 401, a first output limit coefficient calculation unit (a water temperature output limit coefficient calculation unit) 402, a maximum element temperature calculation unit 403, a second output limit coefficient calculation unit (an element temperature output limit coefficient calculation unit) 404, a minimum value selection unit (a limitation coefficient selection unit) 405, a torque limit map (a basic torque limit value calculation unit) 406, and a multiplication unit (a torque limit value determination unit) 407.

The low pass filter calculation unit 401 implements filter processing on a water temperature $T_w$ of the cooling water, detected by the water temperature detection circuit 125, and outputs a filtered water temperature $T_{wf}$. The first output limit coefficient calculation unit 402 calculates a first output limit coefficient $k_1$ on the basis of a value obtained by subtracting the filtered water temperature $T_{wf}$ output by the low pass filter calculation unit 401 from an upper limit element temperature $T^*_{jLMT}$ stored in advance.

The maximum element temperature calculation unit 403 calculates a maximum element temperature $T_{jmax}$ among respective element temperatures $T_{j1}$ to $T_{j6}$, and outputs the maximum element temperature $T_{jmax}$. The second output limit coefficient calculation unit 404 calculates a second output limit coefficient $k_2$ on the basis of the maximum element temperature $T_{jmax}$ output by the maximum element temperature calculation unit 403.

The minimum value selection unit 405 compares the first output limit coefficient $k_1$ output by the first output limit coefficient calculation unit 402 with the second output limit coefficient $k_2$ output by the second output limit coefficient calculation unit 404, and outputs the smaller value thereof as an output limit coefficient k.

The torque limit map 406 is a map storing an upper limit torque in a normal temperature region, and by referring to the map on the basis of a motor rotation speed ωm, a basic torque limit value $Tm_{LMT\_b}$ is read from the torque limit map. The multiplication unit 407 multiplies the basic torque limit value by the output limit coefficient k, and outputs a torque limit value $Tm_{LMT}$.

Figure 5:
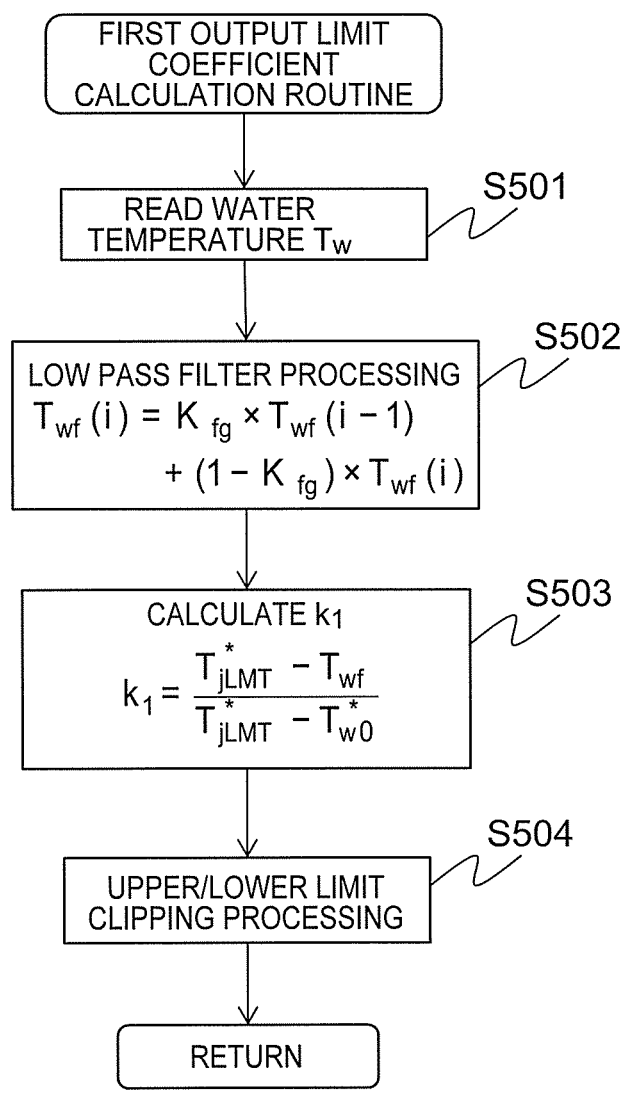
FIG. 5 is a flowchart showing processing executed by a low pass filter calculation unit and a first output limit coefficient calculation unit shown in FIG. 4.

FIG. 5 is a flowchart showing processing executed by the low pass filter calculation unit 401 and the first output limit coefficient calculation unit 402 shown in FIG. 4.

In FIG. 5, first, the water temperature $T_w$ is read (step S501). Next, low pass filter processing is executed on the read water temperature $T_w$ (step S502).

Next, the first output limit coefficient $k_1$ is calculated (step S503).

Here, when thermal resistance from the element temperature to the water temperature is R[° C./W], the upper limit element temperature is $T^*_{jLMT}$[° C.], and a water temperature predicated by design (a temperature at which to start applying limitation) is $T_{w0}$[° C.], an allowable element heat generation amount $Q_{LMT}$ [W] at the upper limit element temperature is expressed by a following equation.

$$Q_{LMT}=(T^*_{jLMT}-T^*_{w0})/R$$

Meanwhile, an allowable element heat generation amount $Q'_{LMT}$ in a case where the water temperature reaches $T_{wf}$, which is higher than $T^*_{w0}$, is expressed by a following equation.

$$Q'_{LMT}=(T^*_{jLMT}-T_{wf})/R$$

Accordingly, the first output limit coefficient $k_1$ at the water temperature $T_{wf}$ is expressed by a following equation.

$$k_1=Q'_{LMT}/Q_{LMT}=(T^*_{jLMT}-T_{wf})/(T^*_{jLMT}-T^*_{w0})$$

Next, upper/lower limit clipping is executed on the first output limit coefficient $k_1$ at lower limit=0.0, upper limit=1.0 (step S504), whereupon the processing of FIG. 5 is terminated.

Figure 6:
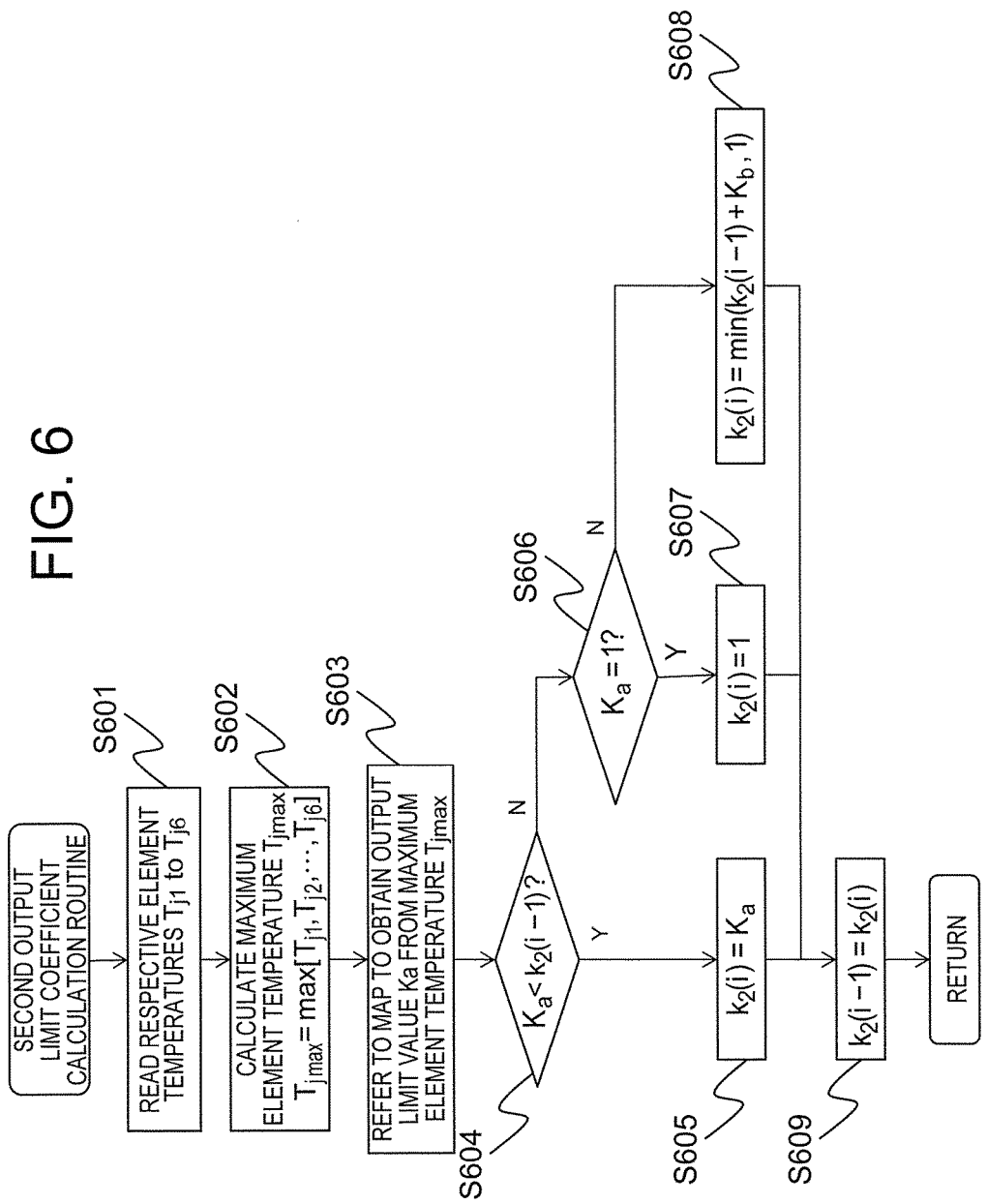
FIG. 6 is a flowchart showing processing executed by a maximum element temperature calculation unit and a second output limit coefficient calculation unit shown in FIG. 4.

FIG. 6 is a flowchart showing processing executed by the maximum element temperature calculation unit 403 and the second output limit coefficient calculation unit 404 shown in FIG. 4.

In FIG. 6, first, the respective element temperatures $T_{j1}$ to $T_{j6}$ are read (step S601).

Next, the maximum element temperature $T_{jmax}$ is calculated (step S602).

Figure 7:
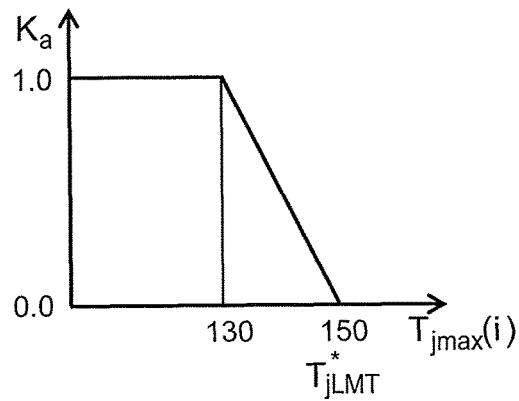
FIG. 7 is an illustrative view showing an output limit value $K_a$ of the protective device for a vehicle inverter according to the first embodiment of this invention.

Next, as shown in FIG. 7, an output limit value $K_a$ is read from the map in accordance with the maximum element temperature $T_{jmax}$ (step S603).

Next, the output limit value $K_a$ is compared with a preceding value $k_2(i-1)$ of the second output limit coefficient (step S604), and when the output limit value $K_a$ is smaller, or in other words when the output limit is large, the correction amount $K_a$ is set at a current value $k_2(i)$ of the second output limit coefficient (step S605).

When the output limit value $K_a$ is larger, on the other hand, a determination is made as to whether or not the output limit value $K_a$ is 1 (step S606). When the maximum element temperature has decreased sufficiently such that the output limit value $K_a$ is already 1, the current value $k_2(i)$ of the second output limit coefficient is also set at 1, whereupon the output limit is removed (step S607).

When the maximum element temperature has not decreased such that the output limit value $K_a$ is not yet 1, the current value $k_2(i-1)$ of the second output limit coefficient is set by adding a predetermined value $K_b$ determined in advance to the preceding value of the second output limit coefficient $k_2$. Note, however, that the second output limit coefficient is clipped at 1 (step S608).

Finally, the preceding value of the second output limit coefficient $k_2$ is updated (step S607), whereupon the processing of FIG. 6 is terminated.

Figure 8:
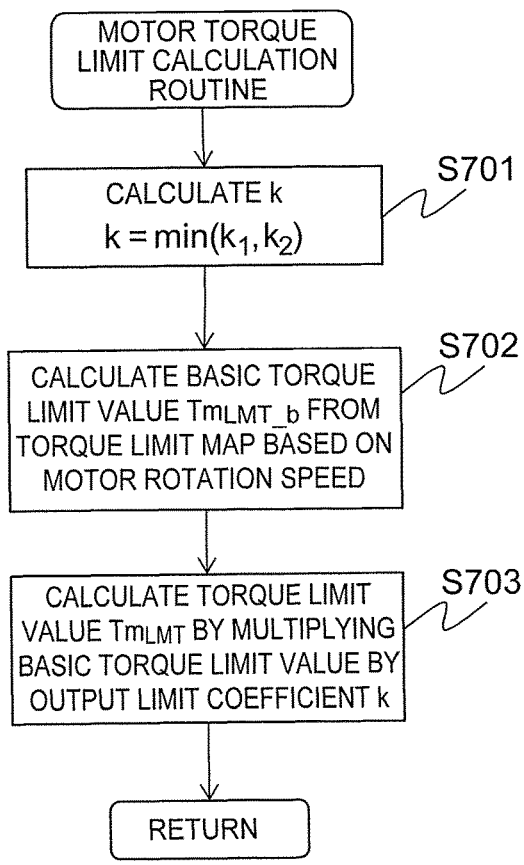
FIG. 8 is a flowchart showing processing executed using a minimum value selection unit, a torque limit map, and a multiplication unit shown in FIG. 4.

FIG. 8 is a flowchart showing processing executed using the minimum value selection unit 405, the torque limit map 406, and the multiplication unit 407 shown in FIG. 4.

In FIG. 8, first, the first output limit coefficient $k_1$ from the first output limit coefficient calculation unit 402 is compared with the second output limit coefficient $k_2$ from the second output limit coefficient calculation unit 404, and the smaller value thereof is output as the output limit coefficient k (step S701).

Next, the basic torque limit value $Tm_{LMT\_b}$ is calculated from the torque limit map on the basis of the motor rotation speed (step S702).

Next, the torque limit value $Tm_{LMT}$ is calculated by multiplying the basic torque limit value by the output limit coefficient k (step S703), whereupon the processing of FIG. 8 is terminated.

Figure 9:
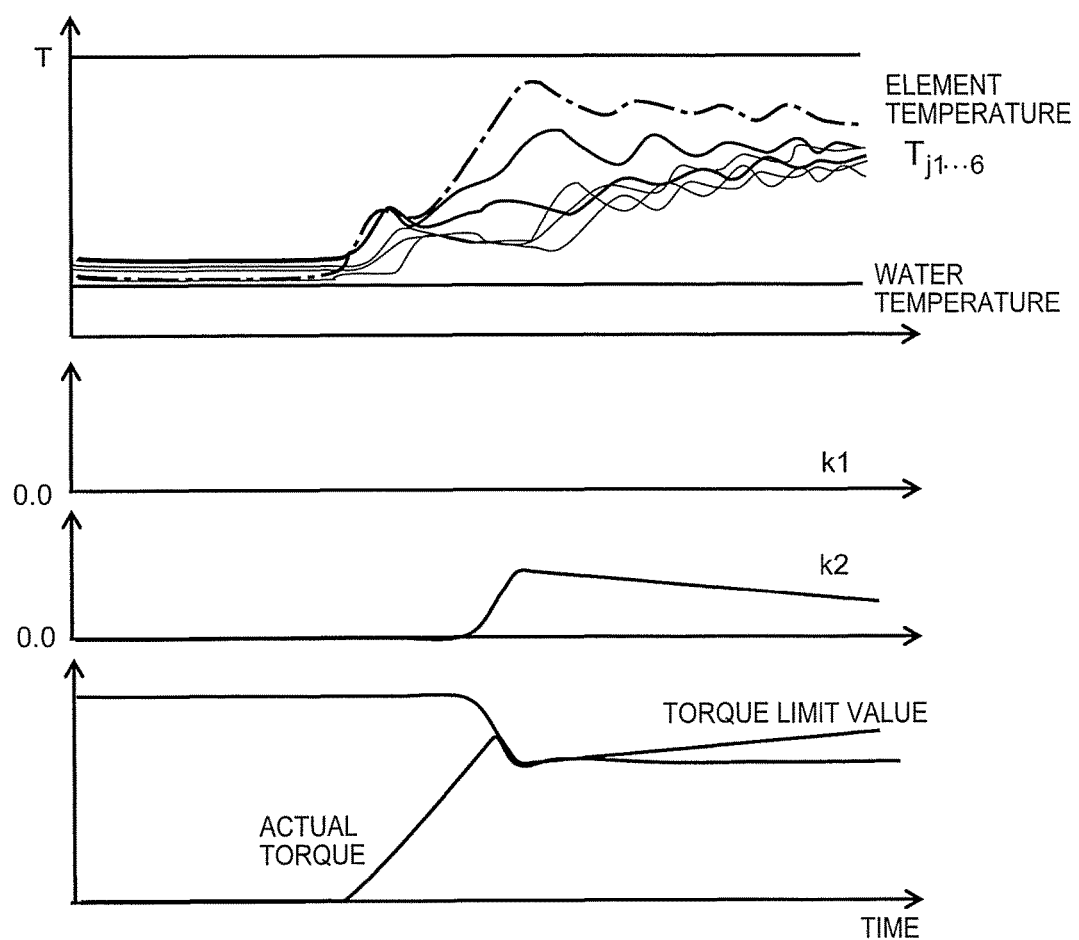
FIG. 9 is an illustrative view showing torque limitation control executed by the protective device for a vehicle inverter according to the first embodiment of this invention in a case where a motor rotates at an extremely low speed.

FIG. 9 is an illustrative view showing torque limitation control executed by the protective device for a vehicle inverter according to the first embodiment of this invention in a case where the motor rotates at an extremely low speed.

In FIG. 9, when the motor rotates at an extremely low speed, a period during which current flows through each individual IGBT is long, and therefore the element temperatures of the respective IGBTs vary greatly. More specifically, the IGBT that is energized in synchronization with the rotation of the motor varies such that the element temperature of the energized IGBT increases while the element temperatures of the non-energized IGBTs decrease, and as a result, the element temperatures vary vertically. This variation is particularly striking in a region where the motor rotation speed is low.

Meanwhile, water temperature behavior occurs at a delay relative to the element temperature behavior. The causes of this delay are thermal resistance from the element to the cooling water and the attachment position of the water temperature sensor.

Here, when observing the water temperature behavior, a temperature history remains in the element temperature in the order in which current starts to flow through the elements, and therefore variation occurs in the behavior of the six element temperatures. In this example, an element indicated by a dot-dash line has the highest temperature, and therefore output limitation must be applied to protect the element indicated by the dot-dash line from overheating.

Hence, in the first embodiment, when the element temperature reaches or exceeds 130 degrees, for example, output limitation starts to have an effect such that the torque limit value (indicated by a dotted line) decreases, thereby limiting the actual torque (indicated by a solid line). Note that the torque limit value continues to decrease over a period in which the element temperature increases.

When the output is limited such that the heat generation amount of the element decreases and the element temperature starts to fall, the torque limit value is reduced in increments of a predetermined value without being affected by the variation in the element temperature. In so doing, torque variation can be suppressed, and as a result, a reduction in drivability can be prevented.

Figure 10:
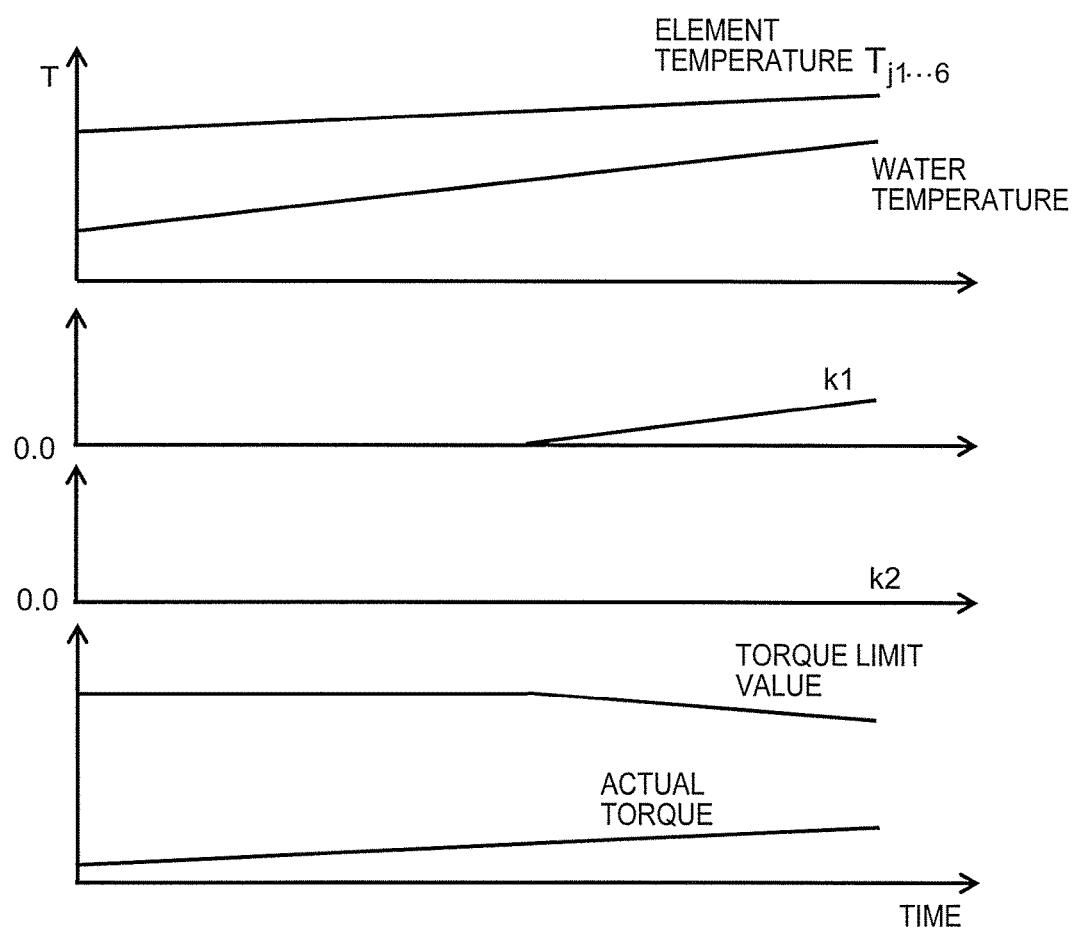
FIG. 10 is an illustrative view showing torque limitation control executed by the protective device for a vehicle inverter according to the first embodiment of this invention in a case where the inverter is not driven.

FIG. 10 is an illustrative view showing torque limitation control executed by the protective device for a vehicle inverter according to the first embodiment of this invention in a case where the inverter is not driven.

As described above, in a hybrid vehicle, a shared system tends to be used as an engine cooling system and a motor/inverter cooling system with the aim of reducing costs.

FIG. 10 shows an example of behavior occurring when a motor operation output is small but an engine operation output is large. In this case, the element temperature varies only slightly, whereas the water temperature increases continuously in response to increases in an engine temperature.

Here, in the first embodiment, output limitation starts to have an effect when the water temperature exceeds 60 degrees, for example, with the result that the torque limit value decreases gently.

According to the first embodiment, it is possible to obtain the protective device for a vehicle inverter described above, which can protect the inverter element from overheating by having the element temperature output limit coefficient calculation unit apply a torque limit rapidly in accordance with the maximum element temperature when the maximum element temperature increases, and which can prevent a reduction in drivability even when the maximum element temperature varies in an oscillatory fashion so as to decrease temporarily by removing the torque limit gradually so that variation in the torque limit is suppressed.

Further, the protective device for a vehicle inverter also includes the water temperature output limit coefficient calculation unit that calculates the water temperature output limit coefficient on the basis of the water temperature of the cooling water in the inverter, and the limit coefficient selection unit that selects and outputs the smaller output limit coefficient of the element temperature output limit coefficient and the water temperature output limit coefficient, wherein the torque limit value determination unit determines the torque limit value by multiplying the basic torque limit value by the element temperature output limit coefficient or the water temperature output limit coefficient selected by the limit coefficient selection unit.

Hence, the element is doubly protected from overheating in accordance with both the water temperature and the element temperature, and is therefore protected more reliably. Furthermore, to ensure that the element is not protected excessively, either the element temperature output limit coefficient or the water temperature output limit coefficient is selected, and as a result, an output performance of the element can be maintained at an appropriate level.

Moreover, the water temperature output limit coefficient calculation unit calculates the water temperature output limit coefficient on the basis of a ratio between the value obtained by subtracting the water temperature of the cooling water from the predetermined upper limit element temperature and the value obtained by subtracting the design water temperature at which to start applying torque limitation from the upper limit element temperature.

As a result, the element can be protected from overheating appropriately on the basis of the water temperature.

The invention claimed is:

1. A protective device for a vehicle inverter, which protects an inverter that drives a motor provided in a vehicle as a power source from overheating, comprising:
    a maximum element temperature calculation unit that calculates a maximum element temperature among respective element temperatures of the inverter;
    an element temperature output limit coefficient calculation unit that calculates an output limit value corresponding to the maximum element temperature, sets a current output limit value as a current output limit coefficient when the current output limit value is smaller than a preceding output limit coefficient, and sets, as the current output limit coefficient, a value obtained by adding a predetermined value determined in advance to the preceding output limit coefficient when the current output limit value equals or exceeds the preceding output limit coefficient;
    a basic torque limit value calculation unit that calculates a basic torque limit value from a map on the basis of a motor rotation speed of the motor; and
    a torque limit value determination unit that determines a torque limit value by multiplying the basic torque limit value by the element temperature output limit coefficient.

2. The protective device for a vehicle inverter according to claim 1, further comprising:
    a water temperature output limit coefficient calculation unit that calculates a water temperature output limit coefficient on the basis of a water temperature of cooling water in the inverter; and
    a limit coefficient selection unit that selects and outputs a smaller output limit coefficient of the element temperature output limit coefficient and the water temperature output limit coefficient,
    wherein the torque limit value determination unit determines the torque limit value by multiplying the basic torque limit value by the element temperature output limit coefficient or the water temperature output limit coefficient selected by the limit coefficient selection unit.

3. The protective device for a vehicle inverter according to claim 2, wherein the water temperature output limit coefficient calculation unit calculates the water temperature output limit coefficient on the basis of a ratio between a value obtained by subtracting the water temperature of the cooling water from a predetermined upper limit element temperature and a value obtained by subtracting a design water temperature, which is a water temperature at which to start applying torque limitation, from the upper limit element temperature.

* * * * *